United States Patent
Gorelik et al.

(10) Patent No.: US 11,847,222 B2
(45) Date of Patent: Dec. 19, 2023

(54) SYSTEM AND METHOD FOR PREVENTING UNWANTED BUNDLED SOFTWARE INSTALLATION

(71) Applicants: Michael Gorelik, West Newton, MA (US); Mordechai Guri, Nof Ayalon (IL); Ronen Yehoshua, Matan (IL); Morphisec Information Security 2014 Ltd., Beer-Sheva (IL)

(72) Inventors: Michael Gorelik, West Newton, MA (US); Mordechai Guri, Nof Ayalon (IL); Ronen Yehoshua, Matan (IL)

(73) Assignee: Morphisec Information Security 2014 Ltd., Beer Sheva (IL)

( * ) Notice: Subject to any disclaimer, the term of this patent is extended or adjusted under 35 U.S.C. 154(b) by 674 days.

(21) Appl. No.: 16/965,170

(22) PCT Filed: Mar. 21, 2019

(86) PCT No.: PCT/IB2019/052326
§ 371 (c)(1),
(2) Date: Jul. 27, 2020

(87) PCT Pub. No.: WO2019/180667
PCT Pub. Date: Sep. 26, 2019

(65) Prior Publication Data
US 2021/0056205 A1    Feb. 25, 2021

Related U.S. Application Data

(60) Provisional application No. 62/646,679, filed on Mar. 22, 2018.

(51) Int. Cl.
*H04L 29/06* (2006.01)
*G06F 21/56* (2013.01)
(Continued)

(52) U.S. Cl.
CPC .............. *G06F 21/566* (2013.01); *G06F 8/61* (2013.01); *H04L 63/1491* (2013.01)

(58) Field of Classification Search
CPC ................................. G06F 21/566; G06F 8/61
See application file for complete search history.

(56) References Cited

U.S. PATENT DOCUMENTS

| | | | |
|---|---|---|---|
| 7,739,682 B1 * | 6/2010 | Badenell | G06F 8/61 717/174 |
| 9,917,855 B1 | 3/2018 | Li et al. | |

(Continued)

FOREIGN PATENT DOCUMENTS

| | | |
|---|---|---|
| WO | 2016079602 A1 | 5/2016 |
| WO | 2019180667 A1 | 9/2019 |

OTHER PUBLICATIONS

International Search Report and Written Opinion received for PCT Patent Application No. PCT/IB2019/052326, dated Jun. 26, 2019, 10 pages.

*Primary Examiner* — Jason K Gee
(74) *Attorney, Agent, or Firm* — PEARL COHEN ZEDEK LATZER BARATZ LLP

(57) ABSTRACT

Embodiments described herein are capable of preventing the installation of unwanted software bundled with a desired application at runtime, while allowing the installation of the desired application to continue as expected. For example, the embodiments described herein create a decoy in memory that preempts unwanted code. The decoy attracts any illegitimate code and diverts it into a dead end (e.g., the code is isolated, thereby preventing it from properly executing), while installation of the legitimate code (i.e., the desired application) flows as expected. The foregoing detects that a reflective loading process of DLL associated with the unwanted application has occurred, identifies the entity that attempted to perform the reflective loading process, and (Continued)

Figure 1:
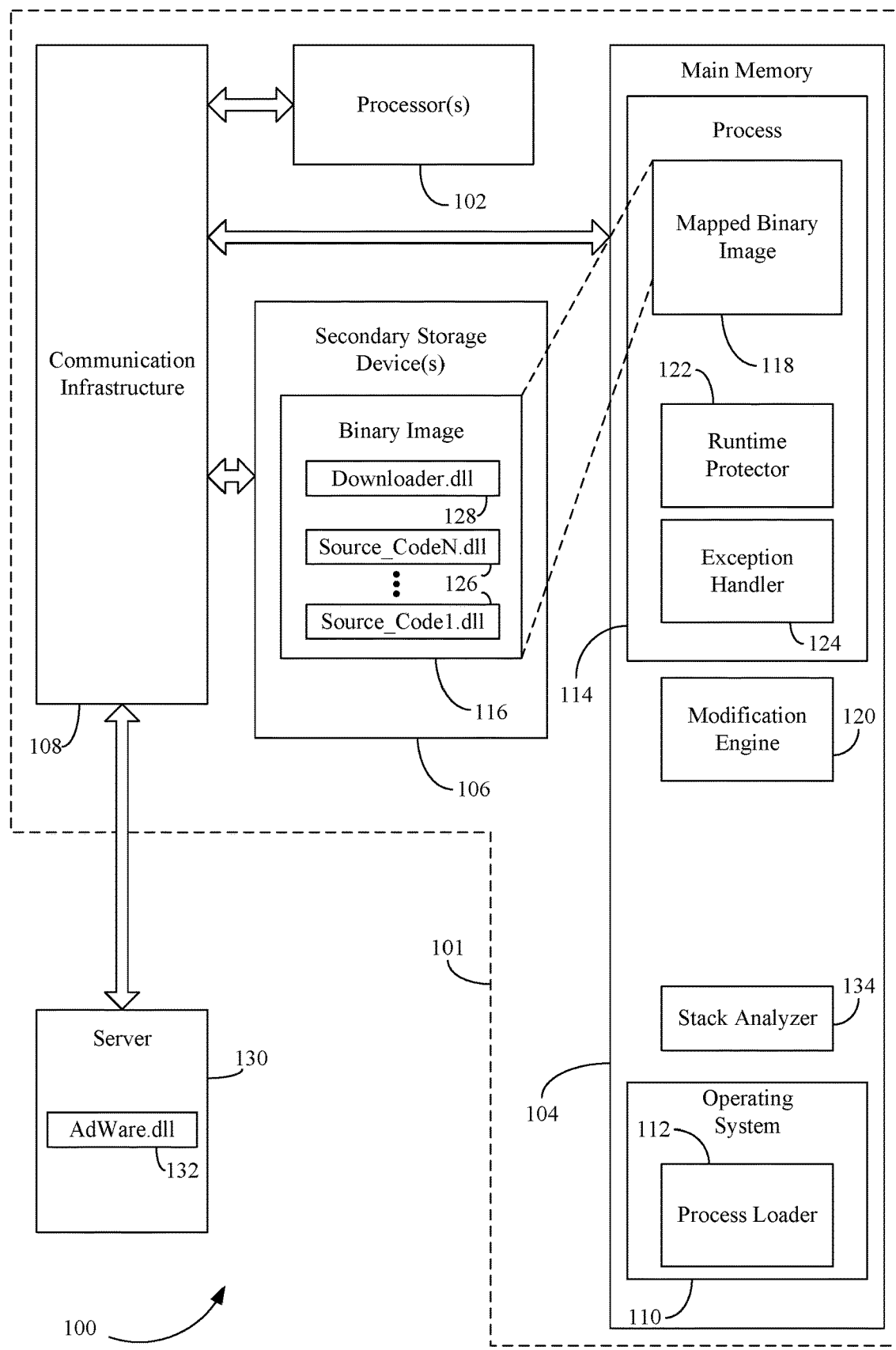

prevents the entity from completing the reflective loading process without terminating the main installer. That is, the main installer will continue as usual (and install the desired application) while the installation of the unwanted application is blocked.

20 Claims, 6 Drawing Sheets

(51) Int. Cl.
    *G06F 8/61*     (2018.01)
    *H04L 9/40*     (2022.01)

(56) References Cited

U.S. PATENT DOCUMENTS

| | | | |
|---|---|---|---|
| 2005/0268112 A1* | 12/2005 | Wang | G06F 21/51 |
| | | | 713/188 |
| 2013/0290662 A1 | 10/2013 | Teal | |
| 2016/0127395 A1* | 5/2016 | Underwood | G06F 21/556 |
| | | | 726/23 |

* cited by examiner

Move one or more pointers associated with the call stack to a point before the downloader is loaded into the memory of the computing device

SYSTEM AND METHOD FOR PREVENTING UNWANTED BUNDLED SOFTWARE INSTALLATION

CROSS REFERENCE TO RELATED APPLICATION

This application is a U.S. national phase application of PCT/IB2019/052326, filed on Mar. 21, 2019, and entitled “System and Method for Preventing Unwanted Bundled Software Installation”, which claims priority to U.S. Provisional Application Ser. No. 62/646,679, filed Mar. 22, 2018, entitled “System and Method for Preventing Unwanted Bundled Software Installation”, the entireties of which are incorporated by reference herein.

BACKGROUND

Technical Field

The subject matter described herein relates to protecting computer systems from unwanted or malicious programs.

Description of Related Art

The size and complexity of certain computer programs often requires a software vendor to pack several components of a program into a software bundle or ‘suite’. Typically, the bundle (or suite) is distributed with an installer program that automates the installation process, or comes in a well-known format which is automatically installable by an Operating System (OS). Some third-party vendors, or free download websites, may add their own components into the bundle, or as a mandatory step in the process of downloading or installing the bundled software. The third-party vendor or website would often promise enhanced functionality or other benefits to persuade the user into using their customized bundle. This widely used practice, however, opens the gate to unwanted components being downloaded and installed on the user’s machine (e.g., a desktop computer or a smartphone). Such unwanted components may range from adware to malware, and expose the user to hazards ranging from annoyance to loss (or theft) of sensitive data. Furthermore, by applying targeted offensive techniques, such software bundles may be used to install malware on a target machine within an organization.

Over 60 million warnings are issued each week by Google® alone regarding the installation of software that try to deceive users into consent. Most of these warnings relate to unwanted software such as adware, where the illegitimate components originate from legitimate software bundles. The payment per each new installation can be as high as $1.50, which can explain the commonality of this strategy. Furthermore, it is grossly assumed that the illegitimate pay per install industry has several hundred players.

The illegitimate “pay per install” industry has gained commonality and sophistication that may defeat state of the art defensive techniques. For example, unwanted adware has snuck into an otherwise legitimate utility program that is downloadable from the Windows Store using Windows 10. Not only has the adware found its way into the Windows Store, it can be successfully downloaded into the user’s machine using both Microsoft Edge and Google Chrome browsers. Only Mozilla (using Google’s Safe Browsing service) has been able to issue a warning on adware in some cases, letting the user decide what to do with the suspected program. However, Google’s Safe Browsing service can be bypassed.

Other techniques commonly used by antivirus and anti-adware software include automatically unchecking the bundled software checkboxes during the installation process. This approach has some limitations. First, it assumes that the user has the option of rejecting the bundled software during the installation process—which is not always the case, especially with bundling of malicious programs. In addition, it is prone to errors such as changing the labels and locations of the checkboxes in the installation windows.

Although a user can sometimes ‘opt-out’ of the bundled installers during the installation of the original software, it has been observed that in most cases the user will choose to stay with the default settings.

Evidently, the current state of the art is not enough in defending the public from the threat of unwanted components snuck into legitimate software bundles, which are gaining an increasing level of sophistication and maintained by the illegitimate “pay per install” industry.

BRIEF SUMMARY

Methods, systems, and apparatuses are described for protecting computer systems from unwanted or malicious programs, substantially as shown in and/or described herein in connection with at least one of the figures, as set forth more completely in the claims.

BRIEF DESCRIPTION OF THE DRAWINGS

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

FIG. 1 depicts components of a system that detects and/or neutralizes the installation of unwanted software bundled with a desired application in accordance with an example embodiment.

FIG. 2 depicts a layout of a binary image in accordance with an example embodiment.

FIG. 3 depicts a flowchart of an example method for detecting and/or neutralizing the installation of unwanted software bundled with a desired application in accordance with an example embodiment.

FIG. 4 depicts a block diagram of a main memory including a process in accordance with an example embodiment.

FIG. 5 depicts a flowchart of an example method for identifying an entity that attempted a reflective loading operation in accordance with an example embodiment.

FIGS. 6A and 6B depict block diagrams of a main memory including a process in accordance with another example embodiment.

FIG. 7 depicts an operation for preventing a first software application component from executing while enabling a second software application component to complete installation in accordance with an example embodiment.

FIG. 8 depicts a block diagram of a computer system that may be configured to perform techniques disclosed herein.

The features and advantages of the disclosed technologies will become more apparent from the detailed description set forth below when taken in conjunction with the drawings, in which like reference characters identify corresponding ele-

DETAILED DESCRIPTION

I. Introduction

The following detailed description refers to the accompanying drawings that illustrate exemplary embodiments. However, the scope of the implementations described herein are not limited to these embodiments, but is instead defined by the appended claims. Thus, embodiments beyond those shown in the accompanying drawings, such as modified versions of the illustrated embodiments, may nevertheless be encompassed by the disclosed implementations.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Numerous exemplary embodiments are now described. The section/subsection headings utilized herein are not intended to be limiting. Embodiments are described throughout this document, and any type of embodiment may be included under any section/subsection. Furthermore, it is contemplated that the disclosed embodiments may be combined with each other in any manner.

II. Example Embodiments

There are several techniques for bundling unwanted third-party software, e.g., adware and malware, with the original software (that a user intends to use). One way is by deploying an additional dynamic link library (DLL) with the original software. This DLL will be loaded and executed during the installation of the original software. The loading is done via a standard DLL loading API. The DLL may contain component(s) of the bundled software (e.g., GUI components and components related to its functionality), or it might initiate a connection to a remote server for downloading the bundled components during the installation. In this case, the DLL is usually shipped as a resource within the original executable file, then extracted and loaded at runtime. The resource bundled or downloaded from the network could be a DLL or code that will be loaded using reflective loading techniques. The reflective loading of the DLL or launching of the process are logically separated from the main installer (e.g., by initiating them from the "DllMain" function of the DLL called by the main installer).

Another way is by forking an external process that will be executed during the installation of the original software. The forked process may contain the component(s) of the bundled software, or it might initiate a connection to a remote server for downloading the bundled components during the installation and loading the bundled components using reflective loading techniques.

Yet another way is by including all of the component(s) of the bundled software with the original software. In this case, the DLLs and/or other files that make up the bundled software are packed and/or embedded (e.g., stored as a resource) inside the original executable. That is, the original executable contains the whole bundled software, embedded within the installable package. This technique enables the bundled software to be fully installed without having to download component(s) from a remote server.

In order to avoid detection, the bundling techniques employ evasive techniques to load the DLLs and launch the process, e.g., by finding the necessary DLLs and APIs via traversal of data structures maintained by the operating system (such as the process environment block (PEB) or the thread environment block (TEB)), and invoking its functionality directly.

The embodiments described herein are capable of preventing the installation of unwanted software bundled with a desired application at runtime, while allowing the installation of the desired application to continue as expected. For example, the embodiments described herein create a decoy in memory that preempts unwanted code. The decoy attracts any illegitimate code (e.g., the unwanted software) and diverts it into a dead end (e.g., the code is isolated, thereby preventing it from properly executing), while installation of the legitimate code (i.e., the desired application) flows as expected. The foregoing detects that a reflective loading process of DLL associated with the unwanted application has occurred, identifies the entity that attempted to perform the reflective loading process, and prevents the entity from completing the reflective loading process without terminating the main installer. That is, the main installer will continue as usual (and install the desired application) while the installation of the unwanted application is blocked.

III. System and Method for Detecting and/or Neutralizing Computer the Installation of Unwanted Software Bundled with a Desired Application Malicious code (e.g., malware) including unwanted adware bundled with a desired application that a user would like to use, relies on some basic assumptions regarding the runtime context of the target process in order to initialize itself and to execute properly. In general, malicious code injected into a running process has to perform some initial steps before it can proceed. It should perform at least some of the initiation steps that the system's default loader would normally perform when creating a running process or a reflectively loaded DLL from an executable downloaded binary image (e.g., the image is downloaded to memory). In particular, it is crucial for the malicious code to obtain the addresses of certain shared libraries (e.g., dynamic-link libraries (DLLs)) as they are mapped into the address space of the running process, and to further obtain the addresses of the procedures (or functions) that it intends to use. In the case where the vulnerability resides inside a shared library, the injected code only needs to find the specific functionality within that library and does not need to locate the library itself.

Various approaches are described herein for, among other things, neutralizing and/or detecting attacks by such malicious code. This may be achieved, for example, by modifying one or more instances of a protected process upon loading by injecting a runtime protector that (a) creates a copy of each of the process' imported libraries and maps the copy into a random address inside the process' address space (to form a randomized "shadow" library), (b) replaces the procedure addresses within the original libraries, to point at a stub (thereby forming a "stub" library), (c) intercepts procedure calls for late library loading and creates a shadow library and a stub library for such libraries, and (d) enabling non-malicious code to work with the "shadow" library to continue the flow of the non-malicious code.

The above technique is referred to herein as "morphing." In one implementation of this technique, the addresses of the shadow libraries (and procedures included therein) are randomized, ensuring that each process and each process' instance obtain a unique protective shield. In accordance with an embodiment, morphing is performed dynamically during initialization of the process, where librar(ies) loaded during process initialization are morphed. In accordance with another embodiment, morphing is performed dynamically during runtime, where librar(ies) loaded during runtime (i.e., after process initialization is complete) are morphed.

In further accordance with this technique, when malicious code (e.g., unwanted adware) attempts to retrieve the address of a given procedure, it will be directed to the stub library (the library at the original address) and receive the address of the stub procedure. Consequently, the injected code will not be able to perform its malicious activities. Furthermore, its presence can be detected. However, when the original program's code (e.g., the non-malicious code) attempts to retrieve the address of a procedure, it will use the address of the shadow library and receive the correct address of the requested procedure. Consequently, the original program's code will proceed normally.

Various embodiments described herein offer at least the following additional advantages: (a) when the presence of malicious code is detected, the malicious code can be sandboxed or otherwise diverted to a secure environment, to deceive the attacker and/or to learn the malware's behavior and intentions; (b) a user or administrator can define, for a given process, a set of procedure calls that are prohibited under any circumstances (also referred to herein as an "API Firewall"); (c) the overall impact on the system's performance may be relatively low, particularly compared to runtime behavioral monitoring, which tries to detect malicious code rather than preempt it; and (d) no prior knowledge of the current malware is assumed, therefore prevention of new, unknown, or zero-day attacks is possible.

Furthermore, embodiments described herein overcome the limitations of address space layout randomization (ASLR) and data execution prevention (DEP), and can be applied in concert with those techniques to gain optimal protection.

For the sake of brevity, embodiments described herein are described in terms of the MICROSOFT® WINDOWS® Operating System (OS), published by Microsoft Corporation of Redmond, Washington. However, as should be clear to any person skilled in the art, this is just one possible embodiment. Similar embodiments may protect practically all kinds of modern operating systems, including LINUX® and other UNIX® variants, against a very wide array of malicious-code attacks, whether remote or local.

Additionally, embodiments described herein refer to morphing techniques associated with librar(ies) for the sake of brevity. However, as should be clear to any person skilled in the art, this is just one possible embodiment. Similar embodiments may protect practically all kinds of codebase elements, including, but not limited to, DLL extensions, Component Object Models (COMs), process management objects, thread management objects, etc.

FIG. 1 depicts components of a system 100 that detects and/or neutralizes the installation of unwanted software bundled with a desired application in accordance with one embodiment. As shown in FIG. 1, system 100 includes a computing device 101 and a server 130. Computing device 101 includes one or more processor(s) 102 (also called central processing units, or CPUs), a primary or main memory 104, and one or more secondary storage device(s) 106. Processor(s) 102, main memory 104 and secondary storage device(s) 106 are connected to a communication infrastructure 108 via a suitable interface, such as one or more communication buses or one or more networks (e.g., wireless or wired networks). In some embodiments, processor(s) 102 can simultaneously operate multiple computing threads, and in some embodiments, processor(s) 102 may each comprise one or more processor core(s). Examples of main memory 104 include a random access memory (RAM) (e.g., dynamic RAM (DRAM), synchronous DRAM (SDRAM), dual-data rate RAM (DDRRAM), etc.). Secondary storage device(s) 106 may include for example, one or more hard disk drives, one or more memory cards, one or more memory sticks, a floppy disk, magnetic tape, compact disk, DVD, optical storage disk, or any other computer data storage device (each of which may be connected to respective device and/or interface for reading and/or writing data thereto).

As shown in FIG. 1, main memory 104 stores an operating system 110. Operating system 110 may manage one or more hardware components (e.g., processor(s) 102, main memory 104, secondary storage device(s) 106, etc.) and software executing on computing device 101. Example hardware components of computing device 101 are described in detail below in reference to FIG. 8.

Operating system 110 may include one or more components that perform certain tasks relating to the execution of software on computing device 101. One such component is a process loader 112. Process loader 112 is configured to initiate the creation of a computing process (or "process") 114 in main memory 104. Process 114 is an instance of a computer program being executed by processor(s) 102. The computer program may comprise an application program (or "application"), a system program, or other computer program being executed by processor(s) 102.

To initiate the creation of process 114, process loader 112 loads (or "maps") binary image 116, which is stored in secondary storage device(s) 106, into an address space allocated for process 114 in main memory 104 based on information included in binary image 116. The binary image mapped into main memory 104 is represented in FIG. 1 by mapped binary image 118. Process loader 112 builds up an initial execution context of process 114. Computer program execution (i.e., process 114) begins when processor(s) 102 commence executing the first instruction of the computer program. Process 114 may comprise one or more threads of execution that execute a subset of instructions concurrently.

As the program execution evolves, other component(s) of operating system 110 allocate various resources to process 114. The execution context of process 114 may comprise information about such resource allocation, a current state of the program execution, an instruction that is to be executed next, and other information related to the program execution. The computer program execution continues until processor(s) 102 execute a termination or suspend instruction.

Additional information regarding the information included in binary image 116 and how process loader 112 maps binary image 116 into main memory 104 based on this information is described below with reference to FIG. 2.

Figure 2:
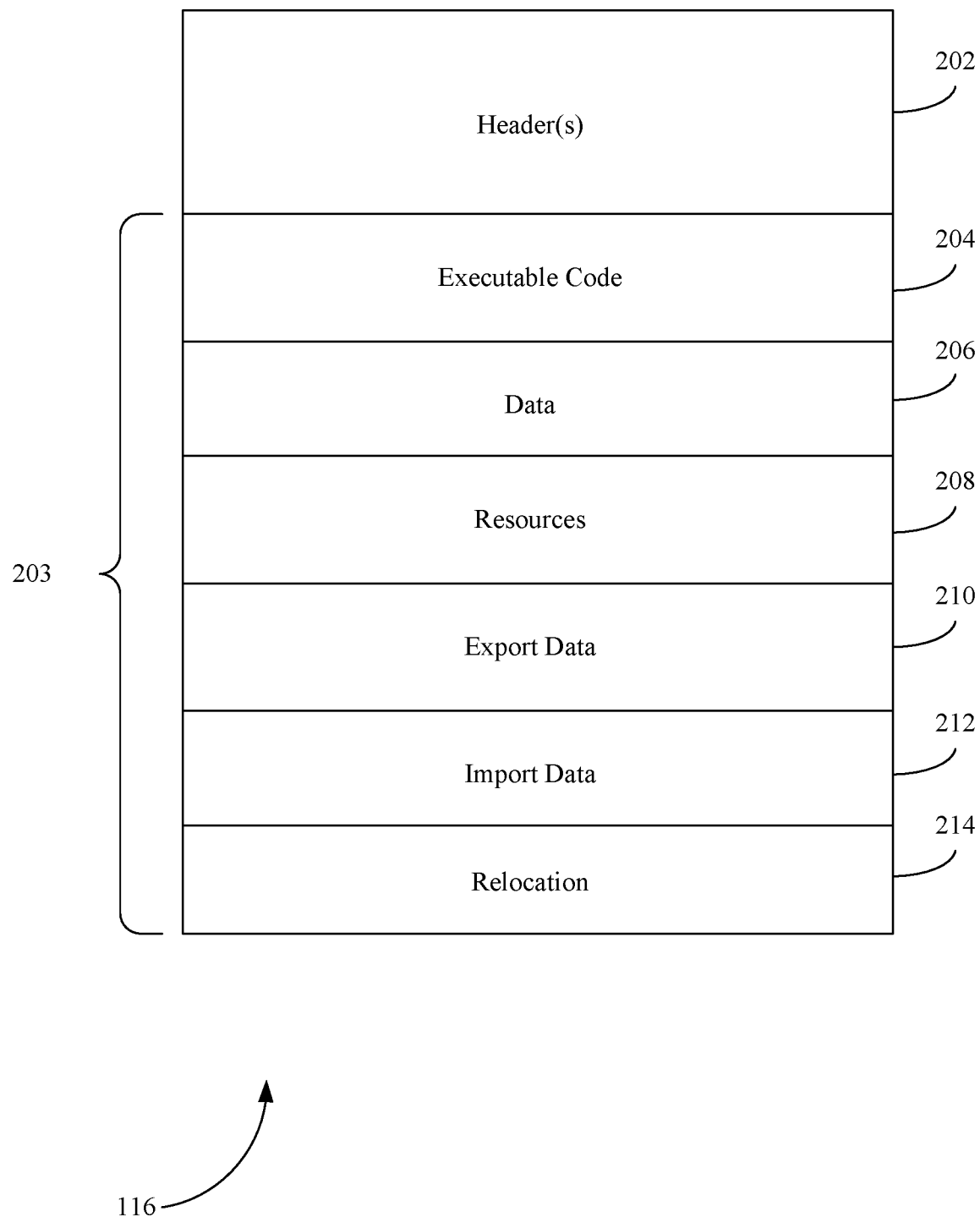

FIG. 2 is an example layout of binary image 116 in accordance with an embodiment. Examples of executable binary formats for binary image 116 include, but are not limited to, the portable executable (PE) format (e.g., files having an .exe, .dll, and a .sys extension), the Executable and Linkable Format (ELF), the Mach object (Mach-O) file format, etc.

As shown in FIG. 2, binary image 116 may comprise one or more headers 202 and/or one or more sections 203, which process loader 112 uses to map binary image 116 (or portions thereof) into main memory 104. Header(s) 202 may comprise information regarding the layout and properties of binary image 116 (e.g., the names, number and/or location of section(s) 203 within binary image 116). Header(s) 202 may also include a base address (also referred to as an image base) that specifies a default address at which binary image 116 is to be loaded into main memory 104. It is noted, however, that binary image 116 may be loaded at a different address. For example, if operating system 110 supports ASLR (which is technique used to guard against certain buffer-overflow based attacks and ROP (return oriented programming) shellcodes by randomizing the location where binary images and its modules are loaded into main memory 104), the address at which binary image 116 is loaded into main memory 104 will be a randomized address.

Section(s) 203 of binary image 116 may comprise an executable code section 204, a data section 206, a resources section 208, an export data section 210, an import data section 212 and a relocation section 214. Executable code section 204 comprises instructions that correspond to the computer program to be executed by processor(s) 102. The instructions may be machine code instructions that are to be executed by processor(s) 102 after binary image 116 is loaded into main memory 104.

Data section 206 comprises uninitialized data required for executing the computer program. Such data includes, but is not limited to, static and/or global variables. Resources section 208 comprises resource information that comprises read-only data required for executing the computer program. Such read-only data includes, but is not limited to, icons, images, menus, strings, etc. The read-only data may be stored in one or more tables (i.e., resource table(s)).

Export data section 210 may include information about the names and/or references of procedures exportable to other binary image(s) (e.g., DLL(s)). The export data may include an export directory that defines the names of exportable procedures included in binary image 116. The addresses of the exportable procedures may be stored in a table (e.g., an export address table (EAT)). The addresses of such exportable procedures may be provided to other binary images in response to the issuance by such other binary images of a procedure call (e.g., GetProcAddress) that identifies the procedure.

Import data section 212 may include information about the names and/or references of procedures that are imported by binary image 116. Import data section 212 may comprise an import directory, which includes information about other binary image(s) (e.g., DLL(s), such as kernel32.dll) from which binary image 116 imports procedures. The information may include a location (e.g., an address) or a pointer to a location of a binary image that includes at least one procedure to be imported. The information may further include an import address table (IAT) that includes the name(s) of procedures to be imported and/or pointers to the procedures to be imported.

During process loading, process loader 112 may check the import data (e.g., the IAT) to determine if one or more additional binary images (e.g., libraries, such as DLLs) are required for process 114. Process loader 112 may map any such required binary image(s) into the address space of process 114. Process loader 114 may recursively parse the respective IATs of each required binary image to determine if further binary image(s) are required and map these further binary image(s) into the address space of process 114.

Process loader 112 replaces the pointers in the respective IATs with the actual addresses at which the procedures are loaded into main memory 104 as the procedures are imported. Such as process may be referred to as IAT fixing. By using pointers, process loader 112 does not need to change the addresses of imported procedures everywhere in code of the computer program that such imported procedures are called. Instead, process loader 112 simply has to add the correct address(es) to a single place (i.e., the IAT), which is referenced by the code.

Relocation data section 214 comprises relocation data that enables process loader 112 to modify addresses associated with code and data items (respectively included in executable code section 204 and data section 206) specified in binary image 116. When a binary image is created (e.g., by a computer program, such as a linker), an assumption is made that the binary image is to be mapped to a base address, as described above. Based on this assumption, the linker inserts the real addresses (relative to the base address) of code and data items in the binary image. If for some reason the binary image is loaded at an address other than the image base (e.g., in the event that the image base is already occupied or due to an ASLR scheme being in place), these real addresses will be invalid. The relocation data enables process loader 112 to modify these addresses in binary image 116 so that they are valid. For example, the relocation data may include a relocation table, which includes a list of pointers that each point to a real address of a code and/or data item. When binary image 116 is remapped to an address other than the image base, process loader 112 updates these pointers. Thereafter, process loader 112 initiates the computer program by passing control to the program code loaded into main memory 104.

Referring again to FIG. 1, in accordance with an embodiment, computing device 101 is configured to prevent the installation of unwanted software bundled with a desired application (e.g., bundled together in an installation package). For example, as shown in FIG. 1, binary image 116 comprises an installer application (e.g., an installer package, such as an MSI file or executable (i.e., a .msi or .exe file)) that is configured to install a software application that a user intends to use (i.e., a desired application). The software application may comprise one or more source code files 126 (shown as "source_code1.dll" through "source_codeN.dll"). Each of source code file 126 may correspond to one or more particular components of the software application (e.g., user interface components, models for handling requests or events, for example, for business rules and data processing, data access objects, services, plugins, APIs, etc.). A publisher of the software application may also bundle a downloader application (or "downloader") 128 (e.g., an adware downloader) with source code files 126 (shown as "downloader.dll"). Downloader application 128 may be a separate file from source code files 126 (e.g., as a separate DLL file, as shown in FIG. 1), or alternatively be integrated into one or more of source code files 126. Source code files 126 and downloader application 128 may be installed and/or loaded into memory 104 in accordance with a specified order. The order may be specified in a manifest that is associated with application installer 116. For example, the manifest may be included with application installer 116.

In order to initiate installation of malicious code, the main installer included in binary image 116 may load downloader application 128 in memory 104 (if included in a separate DLL file) or launch an external process. This is usually done in a thread separated from the main program (or thread or code flow) that installs source code files 126 (i.e., the desired software application). The loaded DLL or external process may initiate shellcode to start the installation the malicious code.

For instance, downloader application 128 may be configured to download malicious code (e.g., adware) from a remote location. For instance, downloader application 128 may send a request to server 130 (e.g., a command-and-control ("C2") server remotely located from computing device 101). Server 130 may store malicious code 132 (shown as "adware.dll"). In response to receiving the request, server 130 provides malicious code 132 to computing device 101. However, malicious code 132 is not stored on secondary storage device(s) 106. Instead, downloader application 128 attempts to write malicious code 130 into an address space allocated for process 114 (or another process) in main memory 104 and load and execute malicious code 130 from main memory 104 (rather than secondary storage device(s) 106). The foregoing technique is referred to as reflective loading.

When performing a reflective loading operation, downloader application 128 may attempt to identify the memory location of a specific known object (e.g., of a procedure or data object having a predetermined fixed address in the process' address space in main memory (e.g., by issuing a procedure call to a procedure provided by operating system 110 configured to retrieve an address of an exported function or variable from a specified DLL (e.g., via a GetProcAddress API procedure)) and using this location to calculate the location of other procedures (e.g., located in an operating system file, such as kernel32.dll) that are required to fulfill the exploit). Downloader application 128 is not able use typical techniques, such as issuing a procedure call to a procedure configured to load a specified module into the address space of process 114 (e.g., via a LoadLibrary API call), as malicious code 132 is not stored on secondary storage device(s) 106.

To neutralize such exploits, computing device 101 may include a modification engine 120, which executes in main memory 104. Modification engine 120 may be configured to modify (or "morph") process 114 to include a runtime protector 122 that causes the location of the in-memory data and code segments to be changed (or obfuscated) upon being loaded into main memory 104 in a random manner and updates legitimate code elements (i.e., addresses, pointers, etc.) with these changes, thereby preventing malicious code 132 from accessing such data and code segments, but still enabling application 126 (and/or components thereof) to be installed on computing device 101. Furthermore, runtime protector 122 maintains the original in-memory data and code skeletons and intercepts any access to these segments to detect malicious activity.

For example, modification engine 120 may be configured to intercept a process creation event issued by operating system 110 (or a component thereof) for process 114. Modification engine 120 may verify that process 114 is designated for protection. For example, modification engine 120 may check that process 114 is included in a list of processes that should be protected. In response to determining that process 114 is to be protected, modification engine 120 injects runtime protector 122 into process 114. Runtime protector 122 may be a library (e.g., a DLL) that is injected into the address space of process 114. When injecting runtime protector 122 into process 114, modification engine 120 may modify the IAT to enforce the loading of runtime protector 122 into process 114, intercept a thread from the kernel of operating system 110 and change its context to execute specific code that loads runtime protector 122, etc. In certain embodiments, the creation of process 114 may be suspended before runtime protector 122 is injected. However, the embodiments described herein are not so limited.

Runtime protector 122 may be configured to determine whether any library modules (e.g., DLLs) have already been loaded into the address space of process 114. In response to determining that library module(s) have already been loaded into the address space of process 114, runtime protector 122 copies the library module(s) into a different, random memory range (referred to as a "shadow" library). The library module(s) loaded into the original address space are modified into a stub library (also referred to as a "shallow library"), which provides stub procedures or functions. Runtime protector 122 updates the IAT mapped into the address space of process 114 with the addresses corresponding to the random memory range. Thereafter, modification engine 120 causes process loader 112 to be released to allow process loader 112 to finalize the process creation for process 114.

Runtime protector 122 may also be configured to create shadow and stub libraries for library module(s) that are loaded after process finalization (e.g., "late" libraries). For example, runtime protector 122 may be configured to hook memory mapping procedure calls (e.g., that map libraries to a particular section of main memory 104, such as NtMapViewOfSection) that load "late" library module(s) into main memory 104. Upon intercepting such procedure calls, runtime protector 122 allows the call to be completed, thereby resulting in the library module(s) being loaded at their intended addresses in main memory 104. Thereafter, runtime protector 122 creates shadow and stub libraries for such library module(s) in a similar manner as described above.

Runtime protector 122 may be further configured to obfuscate or change certain data structures of process 114 being loaded into main memory 104. The data structures, when not obfuscated, may be utilized by a malicious process (e.g., downloader application 128) to determine the location of important DLLs (e.g., kernel32.dll) to invoke the functionality thereof. The data structures may be used by operating system 110 to manage process 114. These data structures may contain information (e.g., context information) for process 114 that enables operating system 110 to manage execution of process 114. Such a data structure may be referred to as a process environment block (PEB). Another data structure that may be loaded in the address space of process 114 is a data structure used by operating system 110 to manage one or more threads associated with process 114. The data structure may contain information (e.g., context information) for the thread(s) that enables operating system 110 to manage execution of the thread(s). Such a data structure may be referred to as a thread environment block (TEB).

In accordance with an embodiment, at least one of one or more elements, names and/or references included in the PEB and/or the TEB and/or the location of the PEB and/or the TEB may be obfuscated. For example, the at least one of the element(s), name(s), and/or reference(s) and/or the locations of the PEB and/or TEB may be randomized by runtime protector 122. Malicious attacks that attempt to leverage the the information included in the PEB and/or TEB to determine locations of certain files, procedures, library modules, and/or tables (e.g., the Import Address Table and/or the Export Address Table) will fail (i.e., such obfuscation prevents the unwanted or malicious process from finding the files, procedures (e.g., functions such LoadLibrary, GetProcAddress, GetModuleHandle, etc.), library modules, and/or tables). Because desired software applications do not utilize such techniques during installation, the installation of desired software applications continue to completion.

Thus, when the original, non-malicious code (e.g., source code files 126) attempts to retrieve a library module handle of a library module including the procedure requested for and/or the address of the procedure in one of the library module(s), it will receive the library module handle of the shadow library module and/or the address of the procedure in the shadow library module. However, when downloader application 128 attempts to retrieve the library module handle of the same library module including the same procedure and/or the address of the procedure in the library module (or attempts to access data structure(s) of process 114), downloader application 128 will receive the library module handle of the stub library module and/or the address of a procedure in the stub library module (or address of the data structure(s) of process 114). Consequently, downloader application 128 will not be able perform its malicious activities (i.e., reflectively load malicious code 130 into the address space of process 114).

In addition, the presence of downloader application 128 may be detected upon accessing the stub library or obfuscated data structures. For example, in accordance with an embodiment, runtime protector 122 modifies the library module(s) (and/or data structures) loaded into the original address space into stub libraries (or stub data structures) by causing operating system 110 to designate the original address spaces at which executable portions (e.g., executable code) of the library module(s) (or data structures) are located as being non-accessible regions. Modification engine 120 may also inject an exception handler 124 into the address space of process 114, which intercepts an exception thrown by operating system 110 when code (e.g., downloader application 128) attempts to access the non-accessible region (i.e., the stub library and/or data structure(s)). Upon detecting the exception, runtime protector 122 may be configured to suspend execution of application installer 116.

After execution of downloader application 128 is suspended, the memory of the targeted process (i.e., process 114) and/or other data structures, such as the targeted process's call stack or heap, may be automatically analyzed to detect whether a reflective loading operation was attempted and to identify the application that attempted the reflective loading operation (e.g., downloader application 128).

For example, computing device 101 may further include a stack analyzer 134, which executes in main memory 104. Stack analyzer 134 may be configured to analyze an order of function calls that are stored in one or more stack frames of the call stack maintained by operating system 110; (ii) function call(s) and/or parameter(s) stored in the stack frame(s) of the call stack to determine which function(s) were called up to the point of the attempted exploitation; (iii) return addresses of function call(s) stored in the call stack and/or code pointed by addresses stored in the call stack; (iv) contents of a call stack (e.g., function(s) called) associated with the user space (a region of main memory 104 allocated for user programs and/or processes) at the time execution of downloader application 128 was suspended; (v) contents of a call stack (e.g., function(s) called) associated with the kernel space (a region of main memory 104 allocated for the kernel of operating system 110) at the time execution of the malicious code was suspended; and/or (vi) a heap allocated by operating system 110 for process 114.

To identify that a reflective loading process was attempted, stack analyzer 134 may analyze one or more stack frames of the call stack to determine whether any function calls were made to a stub library corresponding to a library commonly used to reflectively load a DLL into main memory 114 (e.g., GetProcAddress). Upon identifying such a function call, stack analyzer 134 determines that a reflective loading operation is being attempted. Stack analyzer 134 may provide a notification to runtime protector 122 to indicate that a reflective operation was being attempted.

After making such a determination, stack analyzer 134 analyzes additional entries associated with the stack frame(s) that were pushed onto the call stack before the identified functional call. This is performed to identify the application (i.e., downloader application 128) that issued the identified call. After the application is identified, runtime protector 122 may cause operating system 110 to issue an error (e.g., an error code) to application installer 116, which indicates that the loading of downloader application 128 has failed. To enable the desired application to continue installation, runtime protector 122 may cause operating system 110 to unwind the call stack, e.g., by moving one or more stack pointers (e.g., an extended base pointer (EBP), an extended stack pointer (ESP), an extended instruction pointer (EIP)) to a point before downloader application 128 is loaded into memory 104.

Thereafter, runtime protector 122 resumes execution of application installer 116, which enables application installer 116 to load and/or install any remaining source code files of source code files 116 in accordance with the manifest associated with application installer 116. In an embodiment in which downloader application 128 is integrated with source code files 116, runtime protector 122 may halt execution of application installer 116, thereby preventing installation of both the desired application and the unwanted application.

Accordingly, the installation of unwanted software bundled with a desired application may be detected and/or neutralized in many ways.

Figure 3:
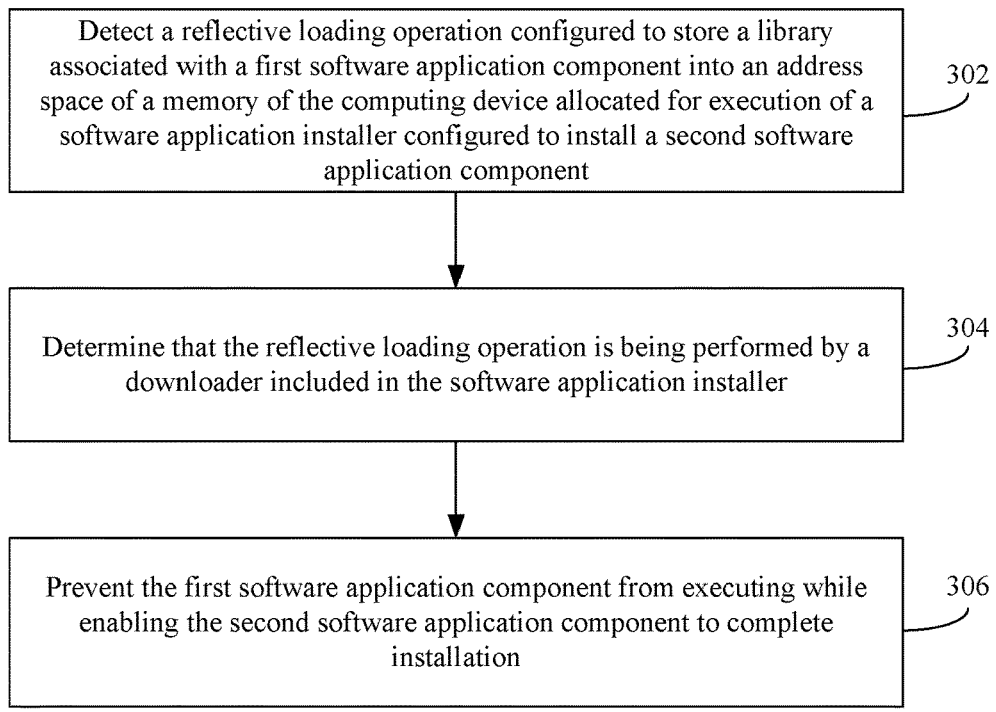
Figure 4:
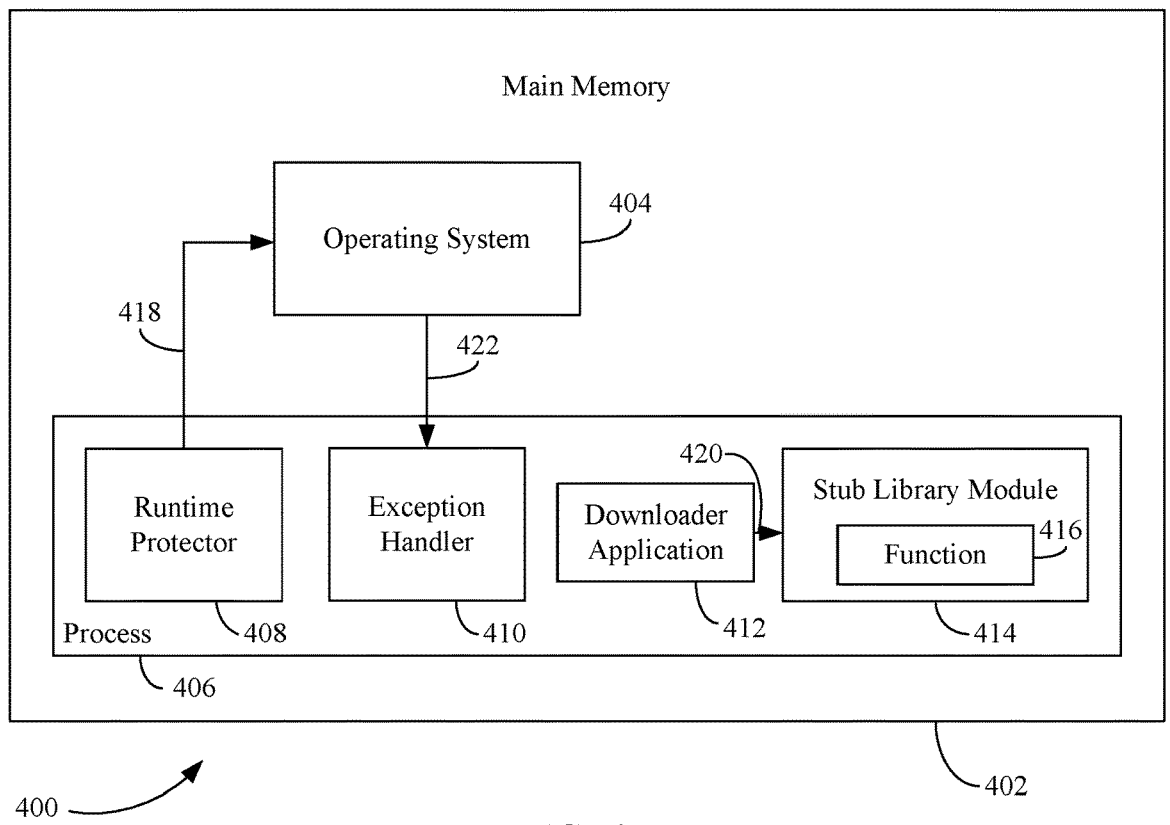

For example, FIG. 3 depicts a flowchart 300 of an example method for detecting and/or neutralizing the installation of unwanted software (and/or components thereof) bundled with a desired application in accordance with an example embodiment. Computing device 101 shown in FIG. 1 may operate according to flowchart 300. For illustrative purposes, flowchart 300 is described with reference to FIG. 4. FIG. 4 depicts a block diagram 400 of a main memory 402 including a process 406 in accordance with an embodiment. Main memory 402 is an example of main memory 104 shown in FIG. 1. As shown in FIG. 4, main memory 402 comprises operating system 404, process 406, runtime protector 408, and exception handler 410, which are examples of operating system 110, process 114, runtime protector 122, and exception handler 124, as respectively described above with reference to FIG. 1. Main memory 404 further comprises a stub library module 414. Stub library module 414 represents a library module that was modified (or morphed) into a stub, for example, by causing one or more executable portions of stub library module 414 to be designated as being non-accessible. For example, runtime protector 408 may issue a command 418 to operating system 404 that causes operating system 404 to designate the executable portion(s) of stub library module 414 to be non-accessible. As further shown, main memory 402 comprises a downloader application 412, which is loaded into main memory 404 by an application installer (e.g., binary image 116, as described above with reference to FIG. 1). In particular, with further reference to FIG. 1, downloader application 412 may represent a version of downloader application 128 that is mapped into the address of process 406. Flowchart 300 and main memory 402 are described as follows.

Flowchart 300 begins with step 302. At step 302, a reflective loading operation configured to store a library associated with a first software application component into an address space of a memory of a computing device allocated for execution of a software application installer configured to install a second software application component is detected. For example, with reference to FIG. 3, runtime protector 408 may detect a reflective loading operation configured to store a library associated with a first software application (e.g., malicious code 132, as shown in FIG. 1) into an address space of memory 402 of a computing device (e.g., computing device 101) allocated for execution of a software application installer (e.g., binary image 116, as shown in FIG. 1) configured to install a second software application component (e.g., a component of application 126).

In accordance with one or more embodiments, the library is downloaded by the downloader from a server (e.g., server 130) remotely located from the computing device (e.g., computing device 101).

In accordance with one or more embodiments, the downloader is stored on a hard disk of the computing device.

In accordance with one or more embodiments, to detect a reflective loading operation, a first function configured to retrieve an address of a second function from a second library specified as an input to the first function is obfuscated and a stub version of the first function is generated. The reflective loading operation comprises a call to the stub version of the first function. For example, with reference to FIG. 4, runtime protector 408 obfuscates a first function (e.g., GetProcAddress) configured to retrieve an address of a second function from a second library (e.g., kernel32.dll) specified as an input to the first function and generates a stub version of the function (i.e., function 416). Runtime protector 408 may also obfuscate a library module that comprises the first function and generates a stub version of the library module (e.g., stub library module 414). Downloader application 412 issues a call 420 to function 416 to determine an address of other functions utilized by malicious code 132 in order to fix the IAT such that malicious code 132 may be reflectively loaded into memory 402.

In accordance with one or more embodiments, an exception thrown by an operating system executing on the computing device is received in response to the downloader issuing the call to the stub version of the first function. The reflective loading operation may be detected based on the exception. For example, with reference to FIG. 4, when downloader application 412 issues call 420 to stub library module 414 for function 416, operating system 404 may throw an exception 422 due to executable portion(s) of stub library module 414 being designated as being non-accessible.

At step 304, in response to detecting the reflective loading operation, a determination is made that the reflective loading operation is being performed by a downloader included in the software application installer. For example, with reference to FIG. 4, runtime protector 408 may determine that the reflective loading operation is being performed by the downloader (e.g., downloader application 412 or downloader application 128) included in software application installer 116 in response to detecting exception 422 received by exception handler 410.

Figure 5:
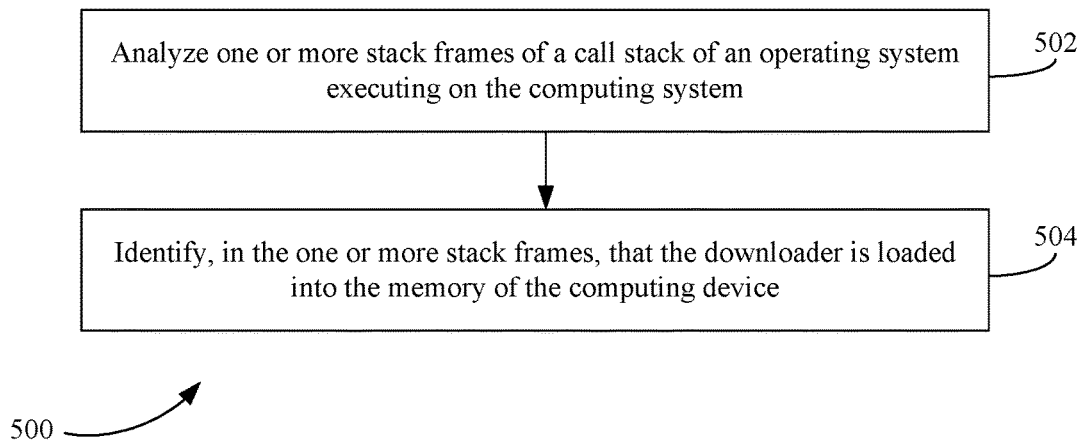
Figure 6A:
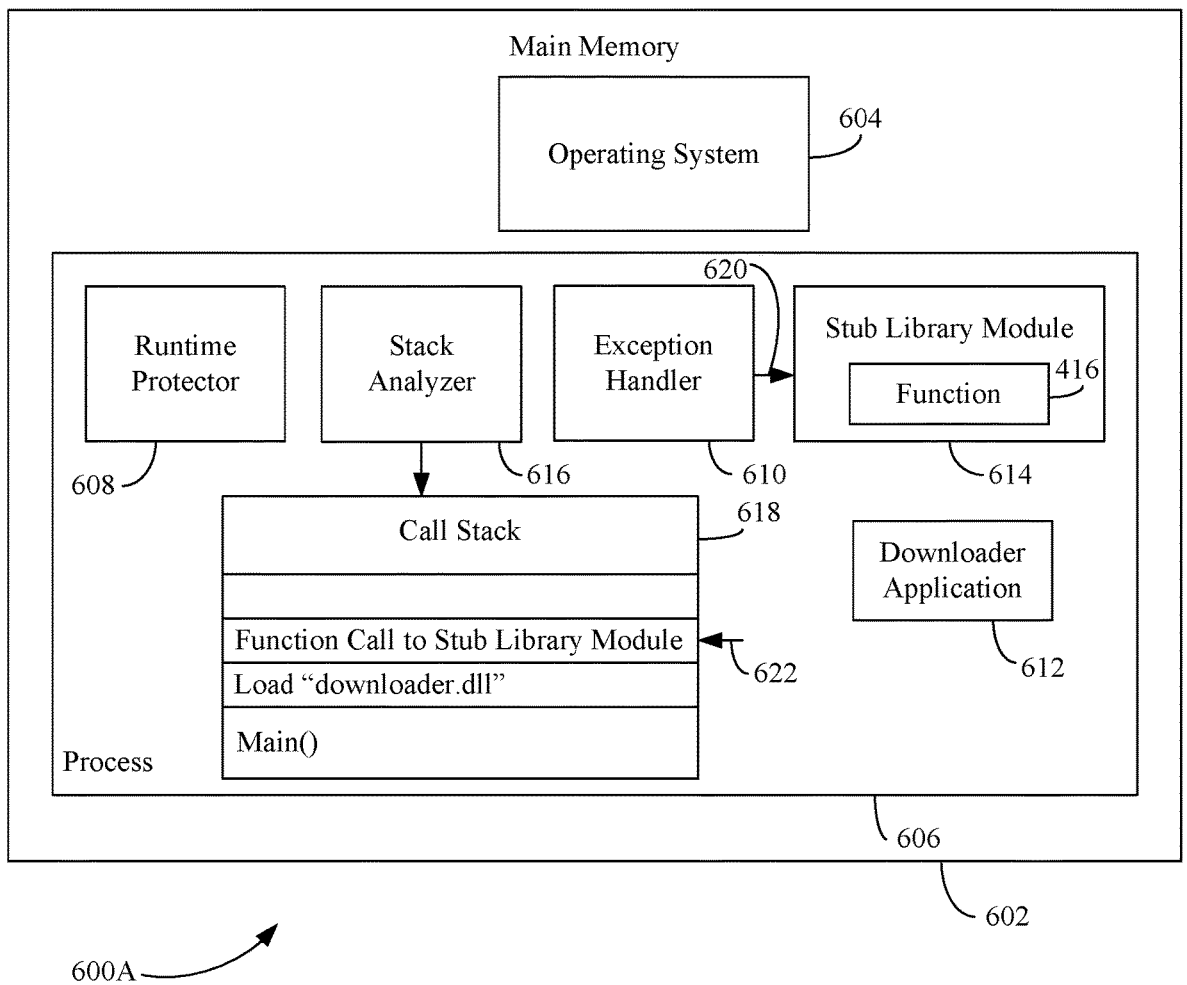

FIG. 5 depicts a flowchart 500 of an example method for identifying an entity that attempted a reflective loading operation in accordance with an example embodiment. Computing device 101 shown in FIG. 1 may operate according to flowchart 500. For illustrative purposes, flowchart 500 is described with reference to FIG. 6A. FIG. 6 shows a block diagram 600A of a main memory 602, according to an embodiment. Main memory 602 is an example of main memory 404 shown in FIG. 4. As shown in FIG. 6, main memory 602 comprises an operating system 604, a process 606, a runtime protector 608, an exception handler 610, and a downloader application 612, which are examples of operating system 404, process 406, runtime protector 408, exception handler 410, and downloader application 412, as respectively described above with reference to FIG. 4. Main memory 602 further comprises a stack analyzer 616, which is an example of stack analyzer 134, as described above with reference to FIG. 1. Stack analyzer 616 is configured to analyze a call stack 618 associated with process 606. Flowchart 500 and main memory 602 are described as follows.

At step 502, one or more stack frames of a call stack of an operating system executing on the computing system are analyzed. For example, with reference to FIG. 6, upon exception handler 610 receiving an exception (e.g., exception 422) from operating system 604, runtime protector 608 may suspend execution of application installer 116 and cause stack analyzer 616 to analyze stack frame(s) of call stack 618 of operating system 604 (in particular, stack frame(s) associated with downloader application 612).

At step 504, the downloader loaded into the memory of the computing device is identified in the stack frame(s). For example, with reference to FIG. 6, stack analyzer 616 analyzes entries of call stack 618 to identify the entity that issued the function call (e.g., call 420). For instance, as shown in FIG. 6, call stack 618 comprises a plurality of entries. The first entry comprise a main function call ("main ( )"), which comprises the main application installer (e.g., of binary image 116) configured to install application 126 and load downloader application 612 (and subsequently install and/or load malicious code 134) into memory 606. The main application installer may perform an operation to load downloader application 612 into memory 606. This operation is stored in the second entry of call stack 618, which includes an identifier that indicates the name of the downloader application 612 (e.g., "downloader.dll") and indicates that downloader application 612 is loaded into memory 606. Downloader application 612 performs call 620 (which is an example of call 420), which is represented in the third entry of call stack 618. The third entry of call stack 618 identifies the function call made by downloader application 612. Stack analyzer 616 may be configured to walk through call stack 618 to identify the function call in the third entry and the identifier of downloader application 612 in the second entry to identify downloader application 612. As further shown, call stack 618 is associated with one or more pointers 622 that point to the top of call stack 618, which indicates the operation being performed at the time of suspension.

Figures 6B, 7:
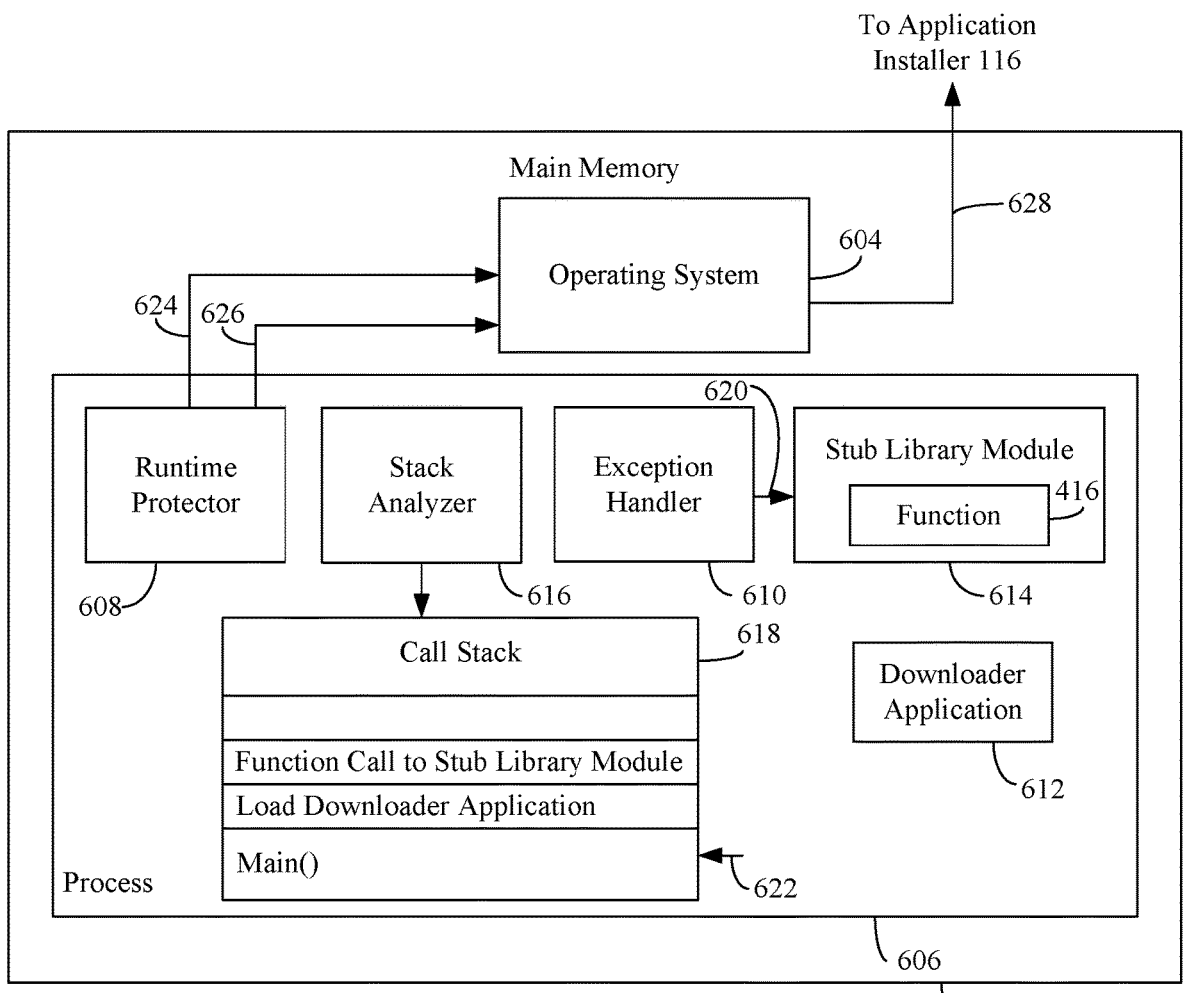

In accordance with one or more embodiments, to prevent the first software application from executing while enabling the second software application to complete installation, stack pointer(s) associated with the call stack are moved to a point before the downloader is loaded into the memory of the computing device. For example, FIG. 7 depicts an operation 700 for preventing a first software application component from executing while enabling a second software application component to complete installation in accordance with an example embodiment. Computing device 101 shown in FIG. 1 may operate according to operation 700. For illustrative purposes, operation 700 is described with reference to FIG. 6B. Step 700 and main memory 602 of FIG. 6B are described as follows.

At step 700, one or more pointers associated with the call stack are moved to a point before the downloader is loaded into the memory of the computing device. For example, with reference to FIG. 6B, runtime protector 608 may provide a command 624 to operating system 604 that causes operating system 604 to move stack pointer(s) 622 to a point before downloader application 612 is loaded into memory 604. For example, as shown in FIG. 6B, stack pointer(s) 622 are moved to the first entry, which causes execution of application installer (e.g., binary image 116) to return to the main installer function. Runtime protector 608 may also provide a command 626 to operating system 604 that causes operating system 604 to return an error 628 (e.g., an error code) to application installer 116 that indicates that the loading of downloader application 128 failed. Responsive to receiving error 628, the main installer function resumes loading of other source code files not yet loaded and that are associated with software application 126 in accordance with the manifest associated with application installer 116. The foregoing causes the installation of malicious code 132 to fail (i.e., malicious code 132 is not loaded into process 606), and the installation of a component of software application 126 to complete.

IV. Additional Example Embodiments

A method performed by a computing device is described herein. The method includes: detecting a reflective loading operation configured to store a library associated with a first software application component into an address space of a memory of the computing device allocated for execution of a software application installer configured to install a second software application component; in response to said detecting, determining that the reflective loading operation is being performed by a downloader included in the software application installer; and in response to determining that the reflective loading operation is being performed by the downloader, preventing the first software application component from executing while enabling the second software application component to complete installation.

In one implementation of the foregoing method, said determining comprises analyzing one or more stack frames of a call stack of an operating system executing on the computing system; and identifying, in the one or more stack frames, that the downloader is loaded into the memory of the computing device based on said analyzing.

In another implementation of the foregoing method, said preventing comprises: moving one or more pointers associated with the call stack to a point before the downloader is loaded into the memory of the computing device.

In another implementation of the foregoing method, the method further includes: obfuscating a first function configured to retrieve an address of a second function from a second library specified as an input to the first function; and generating a stub version of the first function, wherein the reflective loading operation comprises a call to the stub version of the first function.

In another implementation of the foregoing method, said detecting comprising: receiving an exception thrown by an operating system executing on the computing device in response to the downloader issuing the call to the stub version of the first function.

In another implementation of the foregoing method, the library is downloaded by the downloader from a server remotely located from the computing device.

In another implementation of the foregoing method, the downloader is stored on a hard disk of the computing device.

A computing device is also described herein. The computing device includes: one or more processing circuits; and a memory coupled to the one or more processing circuits, the memory storing program code configured to be executed by the one or more processing circuits, the program code comprising: a runtime protector configured to: detect a reflective loading operation configured to store a library associated with a first software application component into an address space of a memory of the computing device allocated for execution of a software application installer configured to install a second software application component; in response to said detection, determine that the reflective loading operation is being performed by a downloader included in the software application installer; and in response to a determination that the reflective loading operation is being performed by the downloader, prevent the first software application component from executing while enabling the second software application component to complete installation.

In one implementation of the computing device, the runtime protector is configured to determine that the reflective loading operation is being performed by the downloader included in the software application installer by: analyzing one or more stack frames of a call stack of an operating system executing on the computing system; and identifying, in the one or more stack frames, that the downloader is loaded into the memory of the computing device based on said analyzing.

In another implementation of the foregoing computer device, the runtime protector is configured to prevent the first software application from executing by: moving one or more pointers associated with the call stack to a point before the downloader is loaded into the memory of the computing device.

In another implementation of the foregoing computing device, the runtime protector is further configured to: obfuscate a first function configured to retrieve an address of a second function from a second library specified as an input to the first function; and generate a stub version of the first function, and wherein the reflective loading operation comprises a call to the stub version of the first function.

In another implementation of the foregoing computing device, the runtime protector is configured to detect the reflective loading operation by: receiving an exception thrown by an operating system executing on the computing device in response to the downloader issuing the call to the stub version of the first function.

In another implementation of the foregoing computing device, the library is downloaded by the downloader from a server remotely located from the computing device.

In another implementation of the foregoing computing device, the downloader is stored on a hard disk of the computing device.

A computer-readable storage medium having program instructions recorded thereon that, when executed by at least one processor circuit of a computing device, perform a method is further described herein. The method includes:

detecting a reflective loading operation configured to store a library associated with a first software application component into an address space of a memory of the computing device allocated for execution of a software application installer configured to install a second software application component; in response to said detecting, determining that the reflective loading operation is being performed by a downloader included in the software application installer; and in response to determining that the reflective loading operation is being performed by the downloader, preventing the first software application component from executing while enabling the second software application component to complete installation.

In one implementation of the foregoing computer-readable storage medium, said determining comprises: analyzing one or more stack frames of a call stack of an operating system executing on the computing system; and identifying, in the one or more stack frames, that the downloader is loaded into the memory of the computing device based on said analyzing.

In another implementation of the foregoing computer-readable storage medium, said preventing comprises: moving one or more pointers associated with the call stack to a point before the downloader is loaded into the memory of the computing device.

In another implementation of the foregoing computer-readable storage medium, the method further includes: obfuscating a first function configured to retrieve an address of a second function from a second library specified as an input to the first function; and generating a stub version of the first function, wherein the reflective loading operation comprises a call to the stub version of the first function.

In another implementation of the foregoing computer-readable storage medium, said detecting comprising: receiving an exception thrown by an operating system executing on the computing device in response to the downloader issuing the call to the stub version of the first function.

In another implementation of the foregoing computer-readable storage medium, the library is downloaded by the downloader from a server remotely located from the computing device.

V. Example Computer System Implementation

Figure 8:
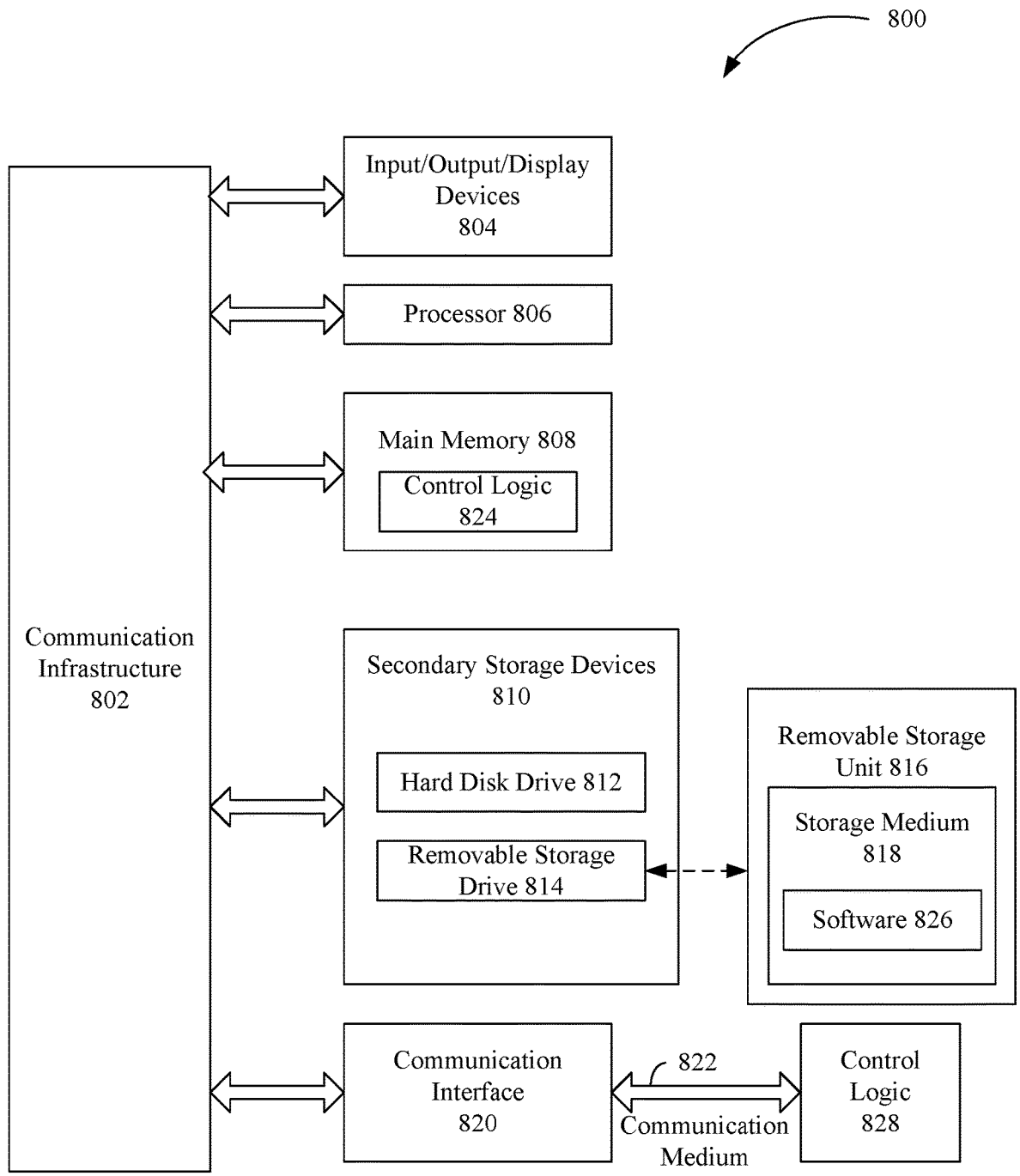

The embodiments described herein, including systems, methods/processes, and/or apparatuses, may be implemented using well known processing devices, telephones (land line based telephones, conference phone terminals, smart phones and/or mobile phones), interactive television, servers, and/or, computers, such as a computer 800 shown in FIG. 8. It should be noted that computer 800 may represent computing devices linked to, processing devices, traditional computers, and/or the like in one or more embodiments. For example, computing device 101 of FIG. 1, and any of the sub-systems, components, and/or models respectively contained therein and/or associated therewith, may be implemented using one or more computers 800.

Computer 800 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 800 may be any type of computer, including a desktop computer, a server, etc.

Computer 800 includes one or more processors (also called central processing units, or CPUs), such as a processor 806. Processor 806 is connected to a communication infrastructure 802, such as a communication bus. In some embodiments, processor 806 can simultaneously operate multiple computing threads, and in some embodiments, processor 806 may comprise one or more processors.

Computer 800 also includes a primary or main memory 808, such as random access memory (RAM). Main memory 808 has stored therein control logic 824 (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 826 (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well-known manner.

Computer 800 also includes input/output/display devices 804, such as touchscreens, LED and LCD displays, monitors, keyboards, pointing devices, etc.

Computer 800 further includes a communication or network interface 820. Communication interface 820 enables computer 800 to communicate with remote devices. For example, communication interface 820 allows computer 800 to communicate over communication networks or mediums 822 (representing a form of a computer useable or readable medium), such as LANs, WANs, the Internet, etc. Network interface 820 may interface with remote sites or networks via wired or wireless connections.

Control logic 828 may be transmitted to and from computer 800 via the communication medium 822.

Any apparatus or manufacture comprising a computer useable or readable medium having control logic (software) stored therein is referred to herein as a computer program product or program storage device. This includes, but is not limited to, computer 800, main memory 808, secondary storage devices 810, and removable storage unit 816. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media and signals transmitted over wired media. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, desktop and/or server computers. A device, as defined herein, is a machine or manufacture as defined by 35 U.S.C. § 101. Devices may include digital circuits, analog circuits, or a combination thereof. Devices may include one or more processor circuits (e.g., central processing units (CPUs) (e.g., processor 906 of FIG. 9), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VI. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the present embodiments should not be limited by any of the above-described example embodiments, but should be defined only in accordance with the following claims and their equivalents.

What is claimed is:

1. A method performed by a computing device, comprising:
   detecting a reflective loading operation configured to store a library associated with a first software application component into an address space of a memory of the computing device allocated for execution of a software application installer configured to install a second software application component;
   in response to said detecting, determining that the reflective loading operation is being performed by a downloader included in the software application installer; and
   in response to determining that the reflective loading operation is being performed by the downloader, preventing the first software application component from executing while enabling the second software application component to complete installation.

2. The method of claim 1, wherein said determining comprises analyzing one or more stack frames of a call stack of an operating system executing on the computing system; and
   identifying, in the one or more stack frames, that the downloader is loaded into the memory of the computing device based on said analyzing.

3. The method of claim 2, wherein said preventing comprises:
   moving one or more pointers associated with the call stack to a point before the downloader is loaded into the memory of the computing device.

4. The method of claim 1, further comprising:
   obfuscating a first function configured to retrieve an address of a second function from a second library specified as an input to the first function; and
   generating a stub version of the first function,
   wherein the reflective loading operation comprises a call to the stub version of the first function.

5. The method of claim 4, wherein said detecting comprising:
   receiving an exception thrown by an operating system executing on the computing device in response to the downloader issuing the call to the stub version of the first function.

6. The method of claim 1, wherein the library is downloaded by the downloader from a server remotely located from the computing device.

7. The method of claim 1, wherein the downloader is stored on a hard disk of the computing device.

8. A computing device, comprising:
   one or more processing circuits; and
   a memory coupled to the one or more processing circuits, the memory storing program code configured to be executed by the one or more processing circuits, the program code comprising:
      a runtime protector configured to:
         detect a reflective loading operation configured to store a library associated with a first software application component into an address space of a memory of the computing device allocated for execution of a software application installer configured to install a second software application component;

in response to said detection, determine that the reflective loading operation is being performed by a downloader included in the software application installer; and in response to a determination that the reflective loading operation is being performed by the downloader, prevent the first software application component from executing while enabling the second software application component to complete installation.

9. The computing device of claim 8, wherein the runtime protector is configured to determine that the reflective loading operation is being performed by the downloader included in the software application installer by:

analyzing one or more stack frames of a call stack of an operating system executing on the computing system; and identifying, in the one or more stack frames, that the downloader is loaded into the memory of the computing device based on said analyzing.

10. The computing device of claim 9, wherein the runtime protector is configured to prevent the first software application from executing by:

moving one or more pointers associated with the call stack to a point before the downloader is loaded into the memory of the computing device.

11. The computing device of claim 8, wherein the runtime protector is further configured to:

obfuscate a first function configured to retrieve an address of a second function from a second library specified as an input to the first function; and generate a stub version of the first function, and wherein the reflective loading operation comprises a call to the stub version of the first function.

12. The computing device of claim 11, wherein the runtime protector is configured to detect the reflective loading operation by:

receiving an exception thrown by an operating system executing on the computing device in response to the downloader issuing the call to the stub version of the first function.

13. The computing device of claim 8, wherein the library is downloaded by the downloader from a server remotely located from the computing device.

14. The computing device of claim 8, wherein the downloader is stored on a hard disk of the computing device.

15. A computer-readable storage medium having program instructions recorded thereon that, when executed by at least one processor circuit of a computing device, perform a method, the method comprising:

detecting a reflective loading operation configured to store a library associated with a first software application component into an address space of a memory of the computing device allocated for execution of a software application installer configured to install a second software application component;

in response to said detecting, determining that the reflective loading operation is being performed by a downloader included in the software application installer; and in response to determining that the reflective loading operation is being performed by the downloader, preventing the first software application component from executing while enabling the second software application component to complete installation.

16. The computer-readable storage medium of claim 15, wherein said determining comprises:

analyzing one or more stack frames of a call stack of an operating system executing on the computing system; and identifying, in the one or more stack frames, that the downloader is loaded into the memory of the computing device based on said analyzing.

17. The computer-readable storage medium of claim 16, wherein said preventing comprises:

moving one or more pointers associated with the call stack to a point before the downloader is loaded into the memory of the computing device.

18. The computer-readable storage medium of claim 15, the method further comprising:

obfuscating a first function configured to retrieve an address of a second function from a second library specified as an input to the first function; and generating a stub version of the first function, wherein the reflective loading operation comprises a call to the stub version of the first function.

19. The computer-readable storage medium of claim 18, wherein said detecting comprising:

receiving an exception thrown by an operating system executing on the computing device in response to the downloader issuing the call to the stub version of the first function.

20. The computer-readable storage medium of claim 15, wherein the library is downloaded by the downloader from a server remotely located from the computing device.

* * * * *